US007383636B2

(12) United States Patent
Knopik et al.

(10) Patent No.: US 7,383,636 B2
(45) Date of Patent: Jun. 10, 2008

(54) TRACKING ATTACHMENT

(75) Inventors: Mike Knopik, Grand Island, NE (US); Ken Olesen, Grand Island, NE (US)

(73) Assignee: Chief Automotive Technologies, Inc., Grand Island, NE (US)

( * ) Notice: Subject to any disclaimer, the term of this patent is extended or adjusted under 35 U.S.C. 154(b) by 232 days.

(21) Appl. No.: 11/380,704

(22) Filed: Apr. 28, 2006

(65) Prior Publication Data
US 2007/0119271 A1 May 31, 2007

Related U.S. Application Data

(60) Provisional application No. 60/731,680, filed on Oct. 31, 2005.

(51) Int. Cl.
*G01B 5/34* (2006.01)
(52) U.S. Cl. .................................. 33/203.18
(58) Field of Classification Search ............. 33/203, 33/203.18, 203.19, 203.2, 288
See application file for complete search history.

(56) References Cited

U.S. PATENT DOCUMENTS

| | | | | |
|---|---|---|---|---|
| 3,445,936 A | * | 5/1969 | Wilkerson | 33/288 |
| 4,303,338 A | * | 12/1981 | Morrison et al. | 33/203.18 |
| 4,402,603 A | * | 9/1983 | Lill | 33/288 |
| 4,455,759 A | * | 6/1984 | Coetsier | 33/288 |
| 4,782,599 A | * | 11/1988 | Bergstrom | 33/288 |
| 4,800,651 A | * | 1/1989 | Hanlon | 33/203.18 |
| 5,179,784 A | * | 1/1993 | Kowis | 33/203.18 |
| 5,488,472 A | * | 1/1996 | January | 33/288 |
| 6,622,389 B1 | * | 9/2003 | Pellegrino | 33/203.18 |
| 6,775,639 B1 | * | 8/2004 | Mason | 33/288 |
| 2006/0185180 A1 | * | 8/2006 | MacKelvie | 33/203.18 |

FOREIGN PATENT DOCUMENTS

JP      06294648 A   * 10/1994 ........... 33/203

* cited by examiner

*Primary Examiner*—G. Bradley Bennett
(74) *Attorney, Agent, or Firm*—Spencer Fane Britt & Browne LLP

(57) ABSTRACT

A tracking attachment (10) adapted and operable to facilitate measuring the alignment characteristics of the rear suspension of a vehicle, including tracking (thrust angle), offset, toe-in and toe-out, and length characteristics. The tracking attachment (10) broadly comprises an adjustment component (12); a bar component (14); one or more target components (16); an alignment component (18); one or more attachment components (20); a centering component (22); and a locking component (24).

21 Claims, 6 Drawing Sheets

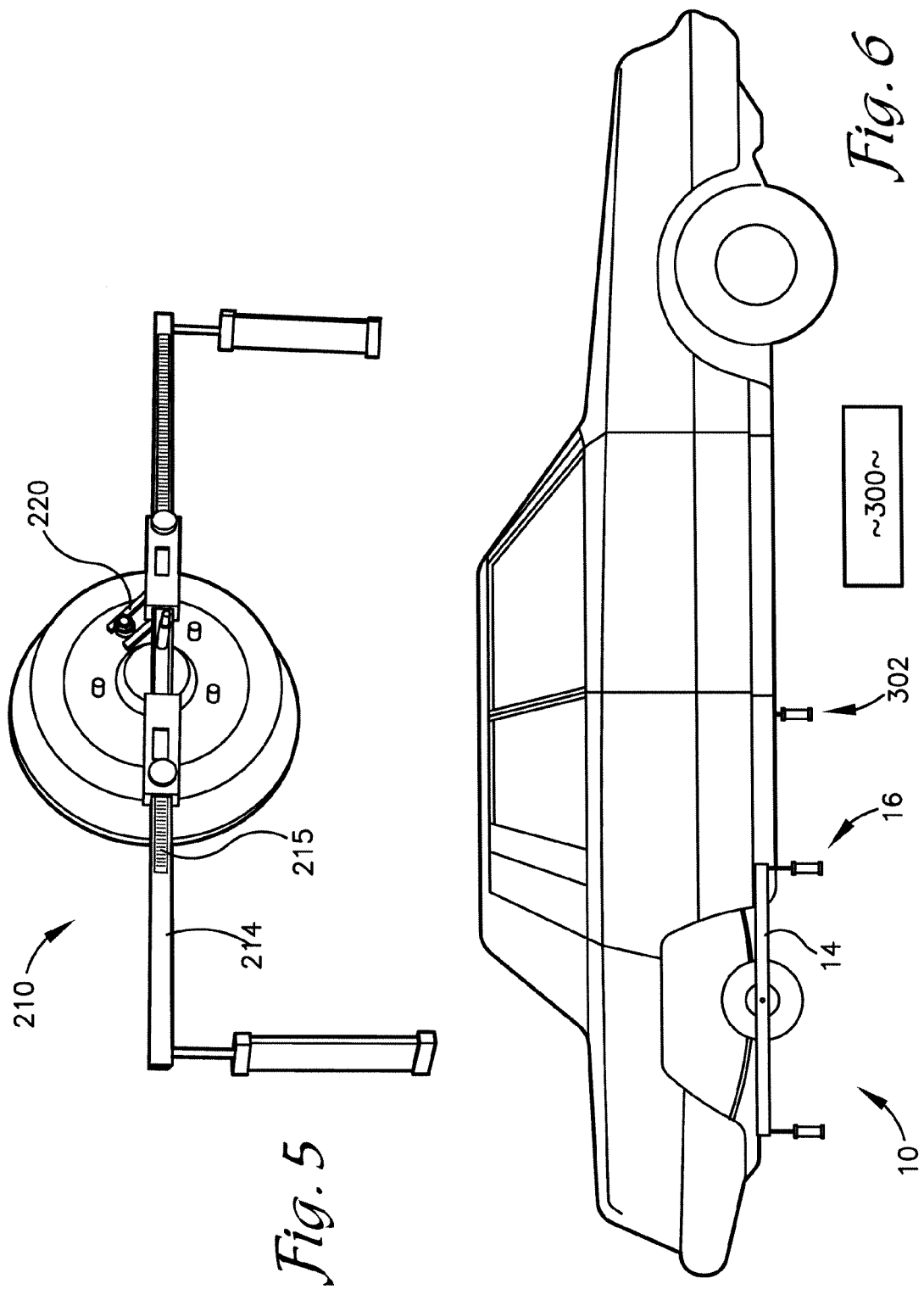

TRACKING ATTACHMENT

RELATED APPLICATIONS

The present U.S. non-provisional patent application claims priority benefit of an earlier-filed now abandoned U.S. provisional patent application of the same title, Ser. No. 60/731,680, filed Oct. 31, 2005. The identified provisional patent application is hereby incorporated by reference into the present non-provisional patent application.

BACKGROUND OF THE INVENTION

1. Field of the Invention

The present invention relates to devices and methods for measuring one or more alignment characteristics of a rear suspension of a vehicle, such as tracking (thrust angle), offset, toe-in and toe-out, and length characteristics.

2. Background of the Invention

Tracking problems can arise in vehicles as a result of Diamond damage or misalignment of the rear wheels. methods of checking tracking include, for example, attaching surveyor's string to a frame, suspension, or other component behind a rear tire; pulling the string across the tire, such that the string is just touching the outer front surface of the tire (i.e., such that the string is substantially parallel with the outer surface of the tire); extending the string to a point further forward on the vehicle, such as the cowl area, and measuring the distance between the string and the frame at that point. This procedure is then repeated on the opposite side of the vehicle. If the two measurements are not equal then adjustments may be required. Also, for each side of the vehicle, while the string is pulled across and parallel to the outer surface of the tire, the tire can be rotated to check for run-out, i.e., variation in the tire or a bent wheel. A similar but more sophisticated method uses a laser plane on the tire rather than surveyor's string to establish a straight line parallel to the outer surface of the tire.

Methods for measuring offset include measuring the distance between the center of the wheel and a point further forward on the frame, such as the frame's centerline. This procedure is then repeated on the opposite side of the vehicle. If the two measurements are not equal then adjustments may be required Other methods for determining these and other alignment characteristics suffer from a number of problems and disadvantages, including, for example, that they can be cumbersome, inconvenient, or time-consuming to employ and that they can result in significant inaccuracy.

SUMMARY OF THE INVENTION

The present invention provides a tracking attachment adapted and operable to facilitate measuring the alignment characteristics of the rear suspension of a vehicle, including tracking (thrust angle), offset, toe-in and toe-out, and length characteristics.

In one embodiment, the tracking attachment broadly comprises an adjustment component; a bar component; one or more target components; an alignment component; one or more attachment components; a centering component; and a locking component. The adjustment component facilitates adjusting the position of the bar component, and takes the form of an adjustment ring including a partial disk presenting an arcing portion and a straight portion. The bar component facilitates supporting the target components in their proper positions for making the desired measurements of the vehicle's suspension, and takes the form of an elongated bar presenting first and second opposite ends, and a target mount at each end. The target components facilitate making the desired measurements of the vehicle's suspension, and take the form of retroreflective bar-coded targets. The alignment component facilitates leveling and aligning the tracking attachment, and takes the form of an alignment ring including a full disk presenting elongated leg adjusting slots on inwardly projecting tabs, and an elongated ring and bar adjusting slot having an arc shape corresponding to the arc of the disk. The attachment components facilitate maintaining the tracking attachment in its proper operating position relative to a wheel drum or hub of the vehicle, and take the form of legs, with each leg including a housing and a magnet and being removably and repositionably coupleable to a respective one of the elongated leg adjusting slots provided by the alignment ring. The centering component facilitates centering and positioning the tracking attachment in its proper operating position relative to the wheel drum or hub of the vehicle, and takes the form of a center pin including a cone end and a pointer end and which is slideably insertable through a through-hole in the bar and a through-hole in the adjustment ring. The locking component facilitates locking the adjustment component and the bar component in proper operating position relative to the alignment component, and takes the form of a locking knob which removably and repositionably engages both a through-hole in the adjustment ring and the elongated ring and bar adjusting slot provided by the alignment ring.

In addition to the aforementioned components, the tracking attachment further includes a pointer alignment block which facilitates aligning and associating the center pin with the adjustment ring and the bar. The center pin is slideably insertable through aligned though-holes in the bar, the adjustment ring, and the pointer alignment block. The pointer alignment block includes a bubble level to facilitate leveling the bar component.

In exemplary use and operation, broadly characterized, the tracking attachment may be used and may function as follows. A technician positions the attachment components so as to associate and maintain the tracking attachment on the vehicle. The technician then centers the centering component over the center of the wheel drum or hub, installs the one or more target components on the bar component, and levels the bar component, which may involve repositioning the adjustment component relative to the alignment component. The technician then locks the leveled bar component in place relative to the alignment component using the locking component. Measurements are then made, manually or automatically, to determine the vehicle characteristic(s) of interest. The technician then repeats the process on the opposite side of vehicle, compares the resulting measurements, and makes adjustments as needed.

Thus, it will be appreciated that the tracking attachment of the present invention provides a number of significant advantages, including, for example, facilitating convenient, efficient, and accurate measurement and determination of various alignment characteristics of a vehicle.

These and other novel features of the present invention are described in more detail in the section titled DETAILED DESCRIPTION OF THE INVENTION, below.

BRIEF DESCRIPTION OF THE DRAWING FIGURES

The present invention is described in detail below with reference to the attached drawing figures, wherein:

FIG. 5 is an elevation view of an alternative embodiment of the tracking attachment of the present invention;

FIG. 6 is a depiction of the tracking attachment of the present invention being used;

DETAILED DESCRIPTION OF THE INVENTION

With reference to the figures, a tracking attachment 10 is described, shown, and otherwise disclosed as being constructed in accordance with a preferred embodiment of the present invention. Broadly characterized, the present invention concerns a tracking attachment 10 adapted and operable to facilitate measuring the alignment characteristics of the rear suspension of a vehicle, including tracking (thrust angle), offset, toe-in and toe-out, and length characteristics. As used herein and in the art, 'tracking' refers to the parallel alignment of the rear suspension with the centerline or the frame of the vehicle, and may include any or all of camber, caster, and toe; 'offset' refers to the lateral alignment of the rear suspension to the centerline or frame of the vehicle; 'toe' refers to the parallel alignment of each wheel to the centerline or to each other; and 'length' refers to the distance between the axle center and the body zero line.

The tracking attachment 10 is designed for use with a laser scanning apparatus 300 and one or more, preferably three or four, base targets 302, shown in FIG. 6, as discussed below. Laser scanning apparatuses are well-known in the prior art and need not be described in detail here.

Figure 1:
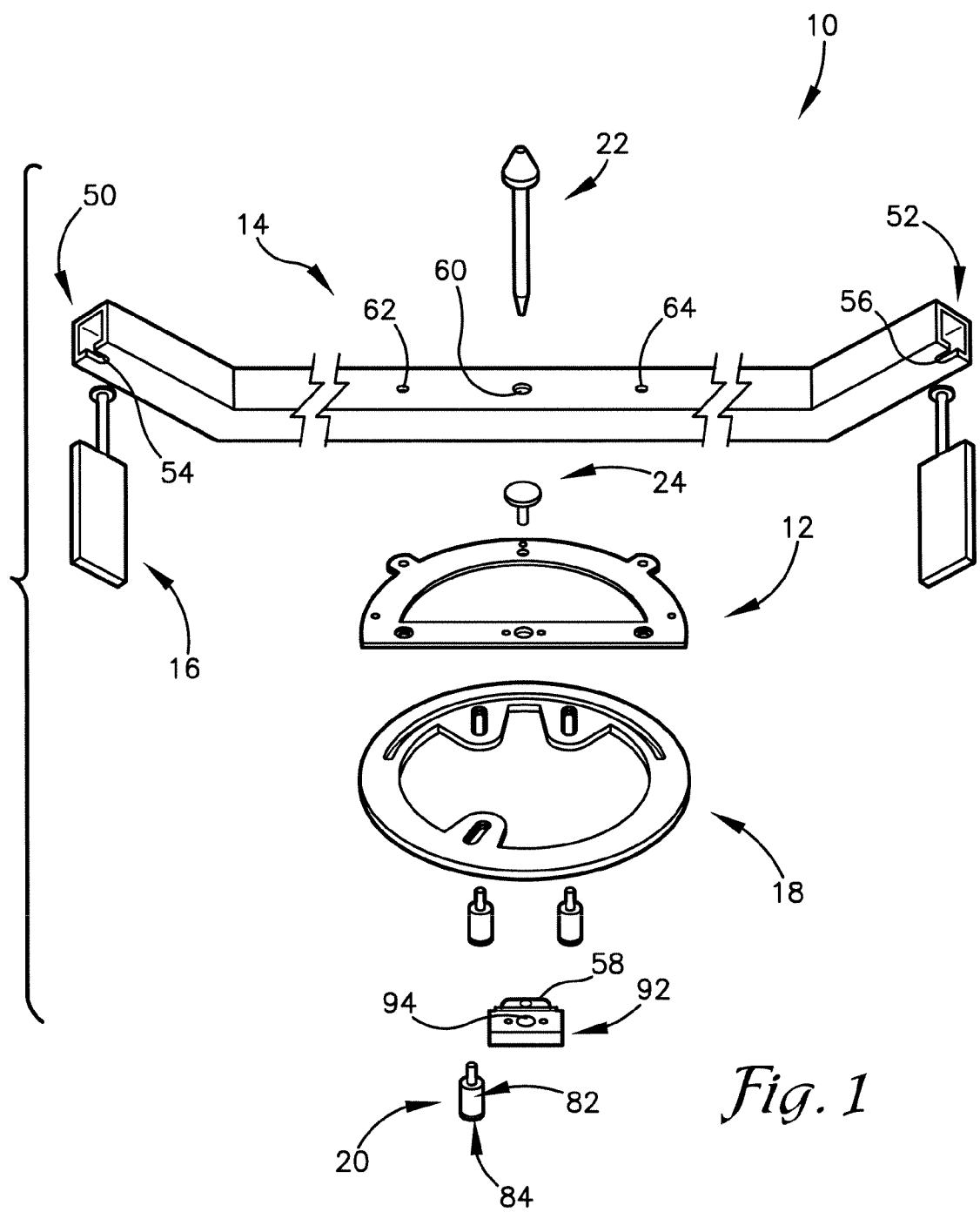
FIG. 1 is an exploded perspective view of an embodiment of the tracking attachment of the present invention.

Referring to FIG. 1, a preferred embodiment of the tracking attachment 10 broadly comprises an adjustment component 12; a bar component 14; one or more target components 16; an alignment component 18; one or more attachment components 20; a centering component 22; and a locking component 24. Unless otherwise noted, all elements are preferably constructed of a strong, lightweight, corrosion resistant material or combination of materials such as aluminum, brass, steel, plastic, or a similarly suitable material or combination of materials. Also, it will be appreciated that certain or all measurements and sizes indicated herein may be adjusted depending on the size of the vehicle or vehicular components with which the tracking attachment is to be used. Thus, for example, a tracking attachment intended for use on a relatively large vehicle may require that certain or all components be made larger or longer than a tracking attachment intended for use on a relatively small vehicle.

Figure 2:
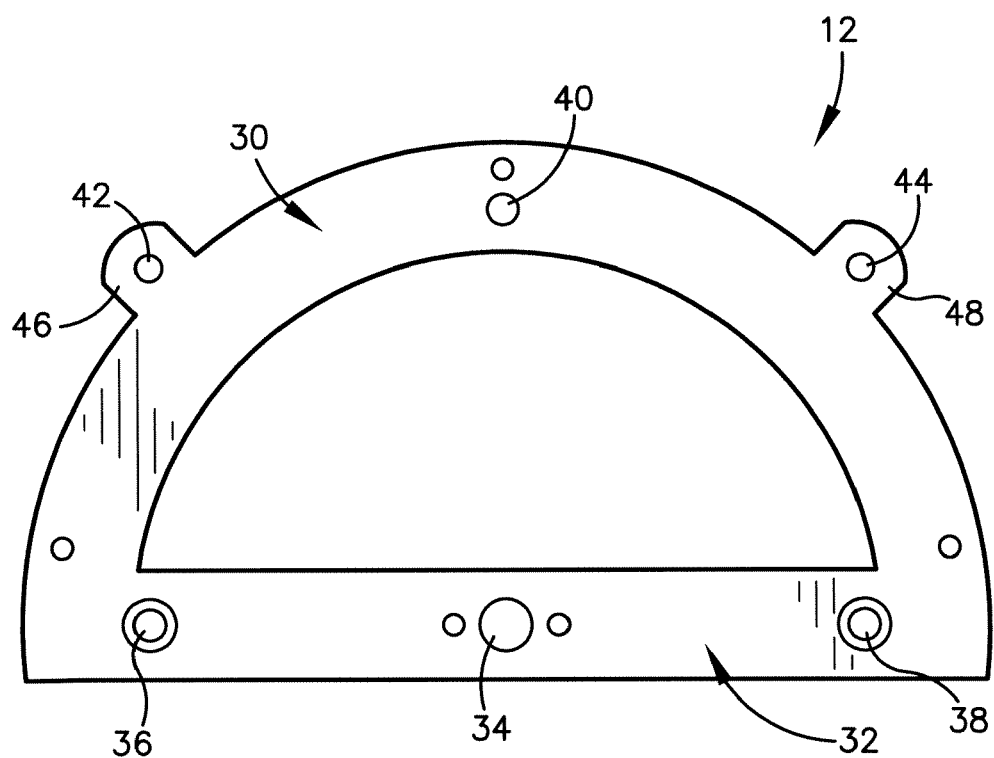
FIG. 2 is a plan view of an embodiment of an alignment component of the tracking attachment shown in FIG. 1.

Referring also to FIG. 2, the adjustment component 12 is adapted and operable to facilitate adjusting the position of the bar component 14, including leveling the bar component 14. The adjustment component 12 preferably takes the form of an adjustment ring including a partial disk, preferably approximately one-half of a full disk, presenting an arcing portion 30 and a straight portion 32, constructed of approximately between 8 gauge and 14 gauge material, preferably 10 gauge material, and having an outer diameter of approximately between 8 inches and 10 inches, preferably 9 inches, and an inner diameter of approximately between 7 inches and 9 inches, preferably 8 inches, with the straight portion 32 of the partial disk having a thickness of approximately between 0.50 inches and 2 inches, preferably 1 inch so as to correspond with the thickness of the arcing portion 30 of the partial disk as defined by the inner and outer diameters. The adjustment ring 12 preferably includes six through-holes: a first hole 34 located at the centerpoint of the partial disk, i.e., the point from which the radius of the arcing portion 30 of the partial disk is measured; second and third holes 36,38 located one to either side of the first hole 34; a fourth hole 40 located on the arcing portion 30 of the partial disk approximately one-half the distance between the second and third holes 36,38 and at the apex of the arcing portion 30; and fifth and sixth holes 42,44 located on respective tabs 46,48 projecting outwardly from the arcing portion 30 of the partial disk, with each tab 46,48 being located one to either side of the fourth hole 40 and approximately midway between the apex of the arcing portion 30 of the partial disk and the straight portion 32 of the partial disk. The purposes of these holes are explained below.

The bar component 14 is adapted and operable to facilitate supporting the one or more target components 16 in their proper positions for making the desired measurements of the vehicle's suspension. The bar component 14 preferably takes the form of an elongated bar constructed of square tubing approximately at least 15 inches long, preferably 20 inches, and presenting first and second opposite ends 50,52. Each end 50,52 is angled at approximately between 25 degrees and 85 degrees, preferably 45 degrees, relative to the intermediate portion of the bar component 14 so as to minimize obstructions between the target components 16 and the laser scanning apparatus. The bar 14 preferably includes one or more, preferably two, target mounts 54,56. Each target mount 54,56 is located at a different point on the bar 14; preferably there are two target mounts 54,56, each located at a respective end 50,52 of the bar 14. The target mounts 50,52 may take the form of open-ended slots or any other suitable form for receiving and retaining the one or more target components. The bar 14 preferably includes three through-holes: a first hole 60 located at the centerpoint of the bar 14; and second and third holes 62,64 located one to either side of the first hole 60. The purposes of these holes are explained below.

Figure 8:
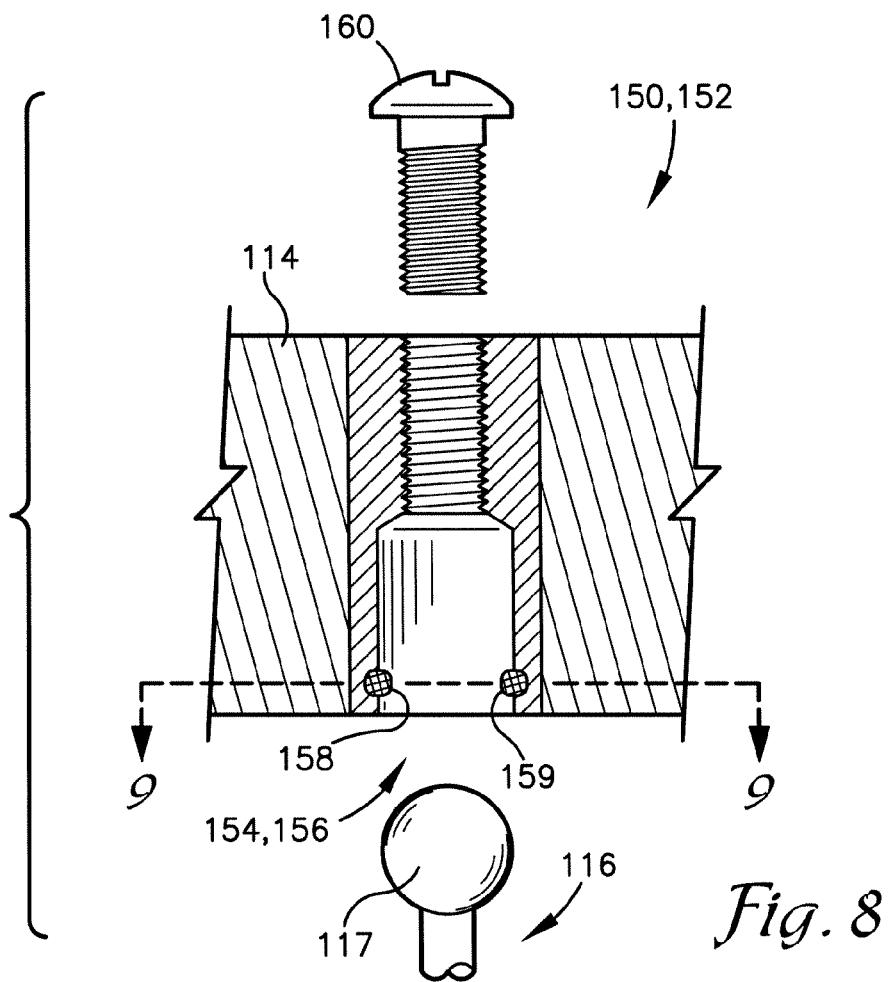
FIG. 8 is a fragmentary cross-sectional elevation view of an end of a bar component of an alternative embodiment of the tracking attachment of the present invention.
Figure 9:
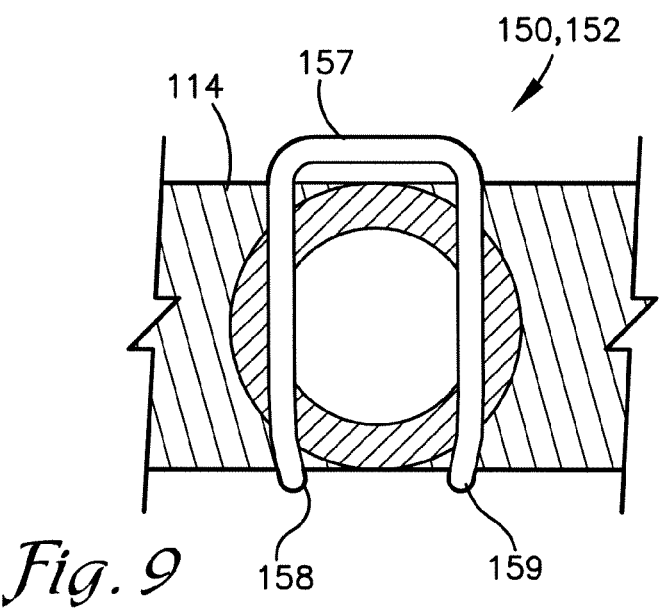
FIG. 9 is a fragmentary cross-sectional plan view of the end of the bar component taken along line A-A of FIG. 8.

Referring also to FIGS. 8 and 9, an alternative embodiment of the target mounts 150,152 is shown which is substantially similar to the above-described embodiment except as follows. Rather than being open-ended slots, the target mounts 150,152 are ball-and-socket type connections. More specifically, an end of each target component 116 presents a ball 117 which fits within a circular socket 154,156 through a bottom surface of the bar component 114. Once the ball 117 is so inserted, a clip 157 having a pair of substantially parallel legs 158,159 is inserted into the bar component 114 beneath the ball 117 so as to trap the ball 117 within the socket 154,156. When it is desired to disassociate the target component 116 from the bar component 114, the clip 157 is removed, allowing the ball 117 to be withdrawn from the socket 154,156. A threaded member 160 may be used to further secure the ball 117 within the socket 154,156 by allowing for applying adjustable force to a surface of the ball 117. The threaded member 160 could, for example, be used to trap the ball 117 against the legs 158,159 of the clip 157 in order to minimize movement of the ball 116 within the socket 154,156.

Referring also to FIG. 5, in another contemplated embodiment, the bar 214 is extendable in length, such as by, for example, telescoping, either from one end or both, and at least some portion of the bar 214 may be marked in standard units of measurement 215 to facilitate visually or manually measuring the extension of the bar 214.

The one or more target components 16 are adapted and operable to facilitate making the desired measurements of the vehicle's suspension. The target components 16 preferably take the form of retroreflective bar-coded targets adapted to reflect laser beams generated by the laser scanning apparatus. Exemplary target components are discussed in U.S. Pat. Nos. 5,801,834, 6,829,046, and 6,765,664, the contents of which are hereby incorporated by reference into the present application. There are preferably two such targets 16, one for each target mount 54,56 at each end 50,52 of the bar 14.

Figure 3:
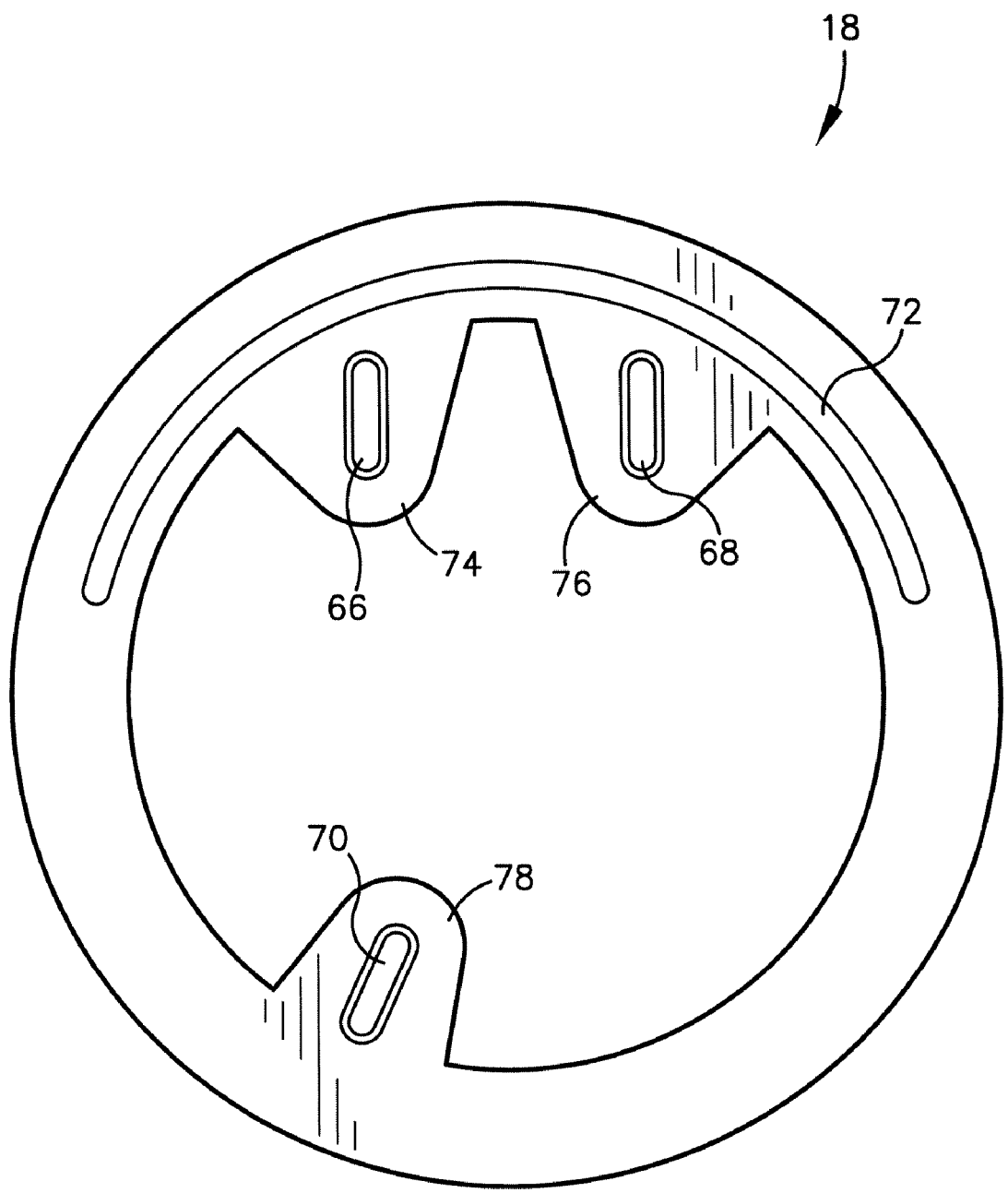
FIG. 3 is a plan view of an embodiment of an adjustment component of the tracking attachment shown in FIG. 1.

Referring also to FIG. 3, the alignment component 18 is adapted and operable to facilitate leveling and aligning the tracking attachment 10 by allowing for independently positioning the adjustment and bar components 12,14. The alignment component 18 preferably takes the form of an alignment ring including a full, or complete, disk, constructed of approximately between 8 gauge and 14 gauge material, preferably 10 gauge material, and having an outer diameter of approximately between 8 inches and 10 inches, preferably 9 inches, and an inner diameter of approximately between 7 inches and 9 inches, preferably 8 inches. The alignment ring 18 includes one or more elongated leg adjusting slots 66,68,70, preferably three such slots, and an elongated ring and bar adjusting slot 72. Each elongated leg adjusting slot 66,68,70 is located on a respective tab 74,76,78 projecting inwardly from the inner radius of the disk, with first and second slotted tabs 74,76 being located substantially adjacent one another and a third slotted tab 78 being located somewhat offset from a point directly opposite the first and second slotted tabs 74,76. The particular locations of the tabs 74,76,78 will be determined by the wheel stud pattern(s) of the vehicle(s) of interest, and the particular locations shown in the figures allow for accommodating a variety of different wheel stud patterns. The elongated ring and bar adjusting slot 72 is arcuate and substantially corresponds to the arc of the disk and extends along an approximately at least 90 degree, preferably closer to a 180 degree, portion of the disk surface, centered relative to the first and second slotted tabs 66,68. The purposes of the slots are explained below.

The one or more attachment components 20 are adapted and operable to facilitate maintaining the tracking attachment 10 in its proper operating position relative to the wheel drum or hub of the vehicle. The one or more attachment components 20 preferably take the form of one or more, preferably three, legs, each including a housing 82 and a magnet 84. Each housing 82 is preferably substantially cylindrical, and may be constructed of, for example, 6061 T6 aluminum, or a similar material or combination of materials. Each magnet 84 is preferably approximately 1 inch in diameter and 0.25 inches in thickness, or otherwise appropriately sized to fit within or onto an end of a respective one of the housings 82. Male or female threads may be provided at the end of each housing 82 which is opposite the magnet 84 in order to facilitate removably and repositionably coupling each leg 20 to a respective one of the first, second, or third, elongated leg adjusting slots 66,68,70 provided by the alignment ring 18. More specifically, each leg 20 can be loosened; repositioned, as needed, within the respective leg adjusting slot 66,68,70 to mount securely to a surface of the wheel drum or hub; and tightened in this new position.

Referring also to FIG. 5, in one contemplated embodiment, the attachment components 220 may instead take the form of legs or clips adapted and operable to engage the wheel studs or to otherwise maintain the tracking attachment 210 in its proper position relative to the wheel drum or hub without using the aforementioned magnets in the manner described.

Figure 4:
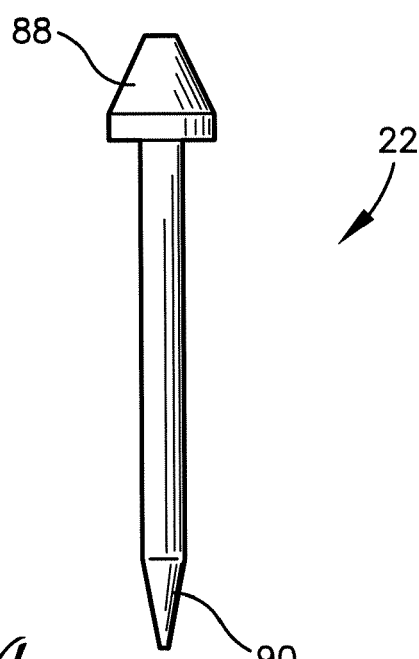
FIG. 4 is an elevation view of an embodiment of a centering component of the tracking attachment shown in FIG. 1.

Referring also to FIG. 4, the centering component 22 is adapted and operable to facilitate centering and positioning the tracking attachment 10 in its proper operating position relative the wheel drum or hub of the vehicle. Centering the tracking attachment 10 is necessary in order to make accurate measurements of the positions of the target components 16 relative to the wheel drum or hub. The centering component 22 preferably takes the form of a center pin including a cone end 88 and a pointer end 90, and which is substantially cylindrical and approximately between 4 inches and 10 inches long, preferably 6.5 inches long, from the end of the cone end 88 to the end of the pointer end 90. The center pin 22 is slideably insertable through the first hole 60 of the bar 14 and the first hole 34 of the adjustment ring 12.

The locking component 24 is adapted and operable to facilitate locking the adjustment component 12 and the bar component 14 in proper operating position relative to the alignment component 18. The locking component 24 preferably takes the form of a locking knob including a plastic knurled-rim clamping knob which is approximately between 1 inch and 2 inches, preferably 1.22 inches, in diameter. The locking knob 24 presents a threaded portion for removably and repositionably engaging both the fourth hole 40 of the adjustment ring 12 and the elongated ring and bar adjusting slot 72 of the alignment ring 18.

With regard to the remaining through-holes of the various components, a bolt or other threaded member may be inserted through the second hole 36 of the adjustment ring 12 and the second hole 62 of the bar 14, and similarly through the third hole 38 of the adjustment ring 12 and the third hole 64 of the bar 14, and used to removably couple the adjustment ring 12 with the bar 14. Additionally, bolts or other members may be inserted through the fifth and sixth holes 42,44 of the adjustment ring 12 and used for spacing, aligning, or securing the adjustment ring 12. More specifically, because the latter bolts reside on the projecting tabs 46,48 of the adjustment ring 12, the heads of the bolts can be positioned so as to overlap the edge of the alignment ring 18 and thereby aid in retaining the adjustment ring 12 and the alignment ring 18 in close and proper operating proximity.

In addition to the aforementioned components, the tracking attachment 10 further includes a pointer alignment block 92 adapted and operable to further facilitate aligning and associating the center pin 22 with the adjustment ring 12 and the bar 14. The pointer alignment block 92 preferably presents a substantially rectangular or otherwise suitably shaped body approximately 1.50 inches long and 1.00 inches high or otherwise suitably sized, and a first through-hole 94 located approximately in the center of the body. Thus, the center pin 22 is slideably insertable through the first hole 60 of the bar 14, the first hole 34 of the adjustment ring 12, and the first hole 94 of the pointer alignment block 92. The pointer alignment block 92 includes a bubble level 58 located above the first through-hole 94. The bubble level 58 is used to level the bar component 14. In an alternative embodiment, the bubble level 58 is located on the bar component 14 above its first hole 60.

Figure 7:
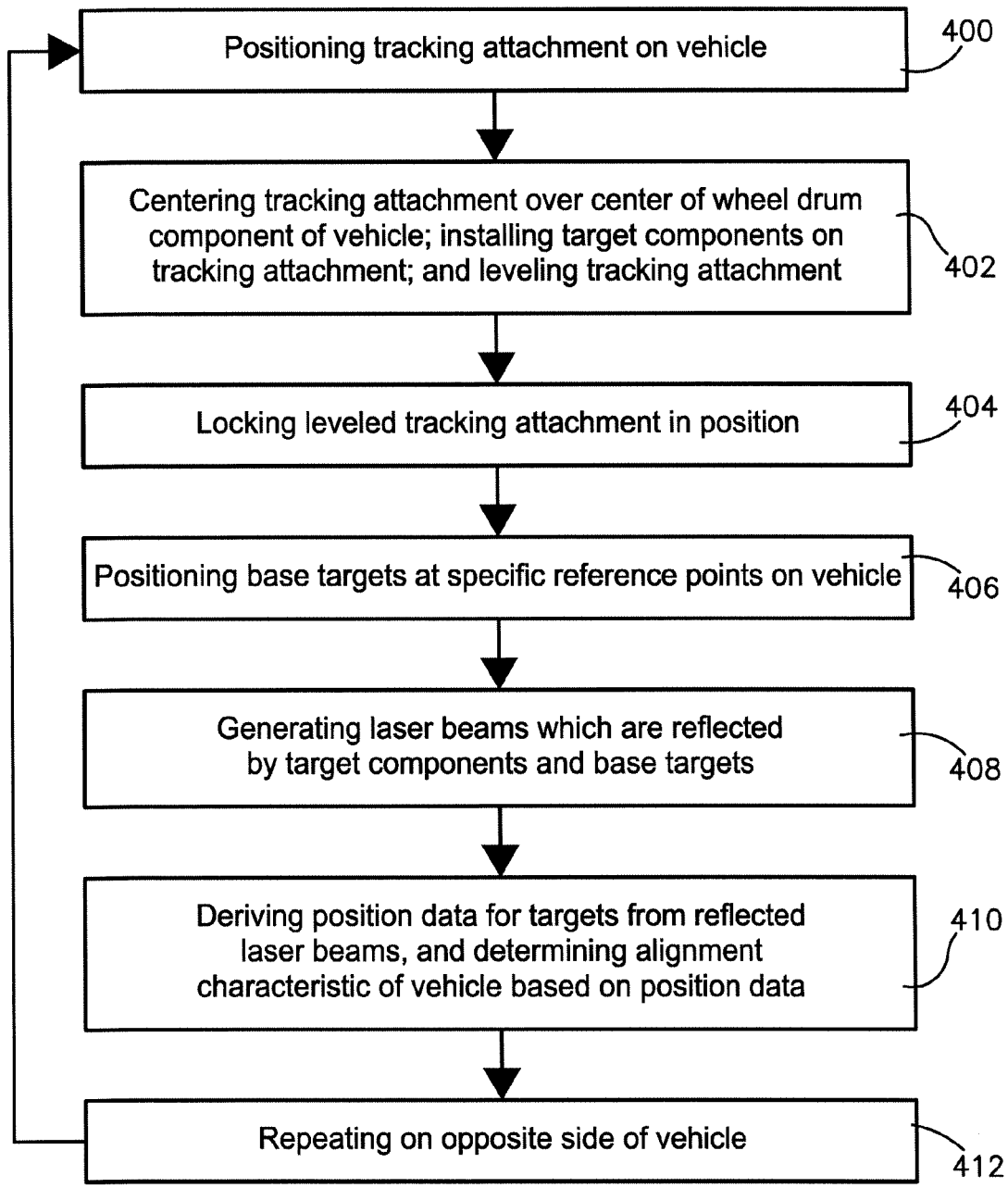
FIG. 7 is a flowchart showing a series of method steps involved in using the present invention.

In exemplary use and operation, broadly characterized, the tracking attachment 10 may be used and may function as follows. Referring also to FIGS. 6 and 7, a technician positions the attachment components 20 so as to associate and maintain the tracking attachment 10 on the vehicle, as shown in box 400. The technician then centers the centering component 22 over the center of the wheel drum or hub, installs the one or more target components 16 on the bar component 14, and levels the bar component 14, which may involve repositioning the adjustment component 12 relative to the alignment component 18, as shown in box 402. The technician then locks the leveled bar component 14 in place relative to the alignment component 18 using the locking component 24, as shown in box 404. The technician then positions the base targets 302 at specific reference points on or associated with the vehicle, as shown in box 406. The laser scanning apparatus 300 then generates laser beams which are reflected by the target components 16 and the base targets 302 back to the laser scanning apparatus 300, as shown in box 408. A processor derives position data from the reflected laser beams and, based thereon, calculates or otherwise determines the vehicle characteristic(s) of interest as a function of the positions of the target components 16 relative to each other and the base targets 302, as shown in box 410. The equations for making these determinations are well-known in or readily derived from the prior art. The technician then repeats the process on the opposite side of vehicle, compares the resulting measurements, and makes adjustments as needed, as shown in box 412.

More specifically characterized, the tracking attachment 10 may be used and may function as follows. The technician applies the vehicle's parking brake, removes a rear wheel, and reinstalls two lug nuts to secure the wheel drum or hub to the axle. The technician then positions the legs 20 between wheel studs, with the first and second legs closer to the top of the wheel drum or hub, such that the magnets 84 in the legs 20 magnetically maintain the tracking attachment 10 in position against the drum or hub. The technician then slides the center pin 22 inward, through the first holes 60,34,92 of the bar 14, adjustment ring 12, and pointer alignment block 92, and centers either the cone end 88 or the pointer end 90, as desired, over the center of the wheel drum or hub. The technician then installs the targets 16 on the target mounts 54,56 at each end of the bar 14. The technician then levels the bar 14 using the bubble level 58, which may involve repositioning the adjustment ring 12 and bar 14 relative to the alignment ring 18. The technician then locks the leveled adjustment ring 12 and bar 14 in place relative to the alignment ring 18 by tightening the locking knob 24. The technician then positions the base targets 302 at specific reference points on or associated with the vehicle. There are preferably three or four base targets 302 to define the vehicle's centerline. The laser scanning apparatus 300 then generates laser beams which are reflected by the target components 16 and the base targets 302 back to the laser scanning apparatus 300. The processor, being either incorporated into the laser scanning apparatus 300 or otherwise in communication therewith, derives position data from the reflected laser beams and, based thereon, calculates or otherwise determines the vehicle characteristic(s) of interest, i.e., tracking, offset, toe-in and toe-out, and/or length, as a function of the positions of the target components 16 relative to each other and the base targets 302. The technician then repeats the process on the opposite side of vehicle, compares the resulting measurements, and makes adjustments as needed.

In one embodiment, the formulas used by the processor to determine the various alignment characteristics are as follows:

Toe left front target position+right front target position=front width, left rear target position +right rear target position = rear width, front width−rear width=+/−toe.

Offset (left front target position+left rear target position)/ 2=offset left side, (right front target position+right rear target position)/ 2=offset right side, offset left side−offset right side=+/−offset.

Tracking Thrust Angle left front target position and left rear target position projected forward 3200 mm, right front target position and right rear target position projected forward 3200 mm, (positive result)=right of centerline, (negative result)= left of centerline.

Length Left and Right (left rear target position+left front target position)/ 2=left length, (right rear target position+rear front target position)/ 2=right length.

Thus, it will be appreciated that the tracking attachment of the present invention provides a number of significant advantages, including, for example, facilitating convenient, efficient, and accurate measurement and determination of various alignment characteristics of a vehicle.

Although the invention has been described with reference to the preferred embodiment illustrated in the attached drawing figures, it is noted that equivalents may be employed and substitutions made herein without departing from the scope of the invention as recited in the claims.

For example, the various dimensions set forth herein, minimum, maximum, and preferred, are for a version of the apparatus of the present invention designed for use on a typical, general-use car or truck. One with ordinary skill in the art will appreciate and understand that any or all of these dimensions may vary depending on such factors as the size and wheel configuration of the vehicle on which other versions of the apparatus are designed for use. Thus, larger vehicles may require larger dimensions than the maximums given herein, while smaller vehicles may require smaller dimensions than the minimums given herein, and either may have different preferred dimensions than those given herein.

Having thus described the preferred embodiment of the invention, what is claimed as new and desired to be protected by Letters Patent includes the following:

1. A tracking attachment for measuring an alignment characteristic of a vehicle, the tracking attachment comprising:
    (a) an adjustment component;
    (b) a bar component fixedly coupled with the adjustment component, and having one or more target mounts for supporting one or more targets for making the desired measurement of the alignment characteristic;
    (c) an alignment component movably coupled with the adjustment component so as to allow for independently positioning the adjustment component and the bar component;
    (d) one or more attachment components for maintaining the tracking attachment in position relative to the vehicle;
    (e) a centering component for centering the tracking attachment relative to a drum component of the vehicle; and
    (f) a locking component for locking the adjustment component and the bar component in position relative to the alignment component once the adjustment component and the bar component have been positioned.

2. The tracking attachment as set forth in claim 1, wherein the tracking attachment allows for measuring tracking, offset, toe-in and toe-out, and length characteristics of the vehicle.

3. The tracking attachment as set forth in claim 1, wherein the adjustment component is an adjustment ring including a partial disk presenting an arcing portion and a straight portion.

4. The tracking attachment as set forth in claim 1, wherein the bar component is an elongated tubular structure presenting first and second opposite ends, one of the one or more target mounts at each end, and a bubble level.

5. The tracking attachment as set forth in claim 1, wherein the alignment component is an alignment ring including a full disk presenting elongated leg adjusting slots on inwardly projecting tabs for coupling with the one or more attachment components, and an elongated ring and bar adjusting slot for coupling with the adjustment component.

6. The tracking attachment as set forth in claim 1, wherein the one or more attachment components are legs, with each leg including a housing and a magnet.

7. The tracking attachment as set forth in claim 1, wherein the centering component is a pin including a cone end and a pointer end.

8. The tracking attachment as set forth in claim 7, wherein the pin is slideably insertable through the bar component and the adjustment component.

9. The tracking attachment as set forth in claim 1, further including the one or more targets for making the desired measurement of the alignment.

10. The tracking attachment as set forth in claim 9, wherein the one or more target components are retroreflective bar-coded targets.

11. A tracking attachment for measuring an alignment characteristic of a vehicle, the tracking attachment comprising:
    (a) an adjustment ring;
    (b) a bar fixedly coupled with the adjustment component and having first and second ends;
    (c) first and second target mounts for supporting, respectively, first and second targets for making the desired measurement of the alignment characteristic, with the first and second target mounts being located, respectively, at the first and second ends of the bar;
    (d) an alignment ring movably coupled with the adjustment ring so as to allow for independently positioning the adjustment ring and the bar;
    (e) one or more attachment components for maintaining the tracking attachment in position relative to the vehicle;
    (f) a centering pin for centering the tracking attachment relative to a drum component of the vehicle, wherein the centering pin is slideably insertable through the bar and the adjustment ring; and
    (g) a locking component for locking the adjustment ring and the bar in position relative to the alignment ring once the adjustment ring and the bar have been positioned.

12. The tracking attachment as set forth in claim 11, wherein the tracking attachment allows for measuring tracking, offset, toe-in and toe-out, and length characteristics of the vehicle.

13. The tracking attachment as set forth in claim 11, wherein the bar further includes a bubble level.

14. The tracking attachment as set forth in claim 11, wherein the alignment ring includes a full disk presenting elongated leg adjusting slots on inwardly projecting tabs for coupling with the one or more attachment components, and an elongated ring and bar adjusting slot for coupling with the adjustment ring.

15. The tracking attachment as set forth in claim 11, wherein the one or more attachment components are legs, with each leg including a housing and a magnet.

16. The tracking attachment as set forth in claim 11, wherein the centering pin includes a cone end and a pointer end.

17. The tracking attachment as set forth in claim 11, further including the one or more targets for making the desired measurement of the alignment.

18. The tracking attachment as set forth in claim 17, wherein the one or more target components are retroreflective bar-coded targets.

19. A tracking attachment for measuring tracking, offset, toe-in and toe-out, and length characteristics of a vehicle having a drum component, the tracking attachment comprising:
    (a) an adjustment ring;
    (b) a bar fixedly coupled with the adjustment ring and having first and second ends and a bubble level;
    (c) first and second target mounts located, respectively, at the first and second ends of the bar;
    (d) first and second targets for making the desired measurements of the characteristics, wherein the first and second targets are coupled, respectively, with the first and second target mounts;
    (e) an alignment ring movably coupled with the adjustment ring for independently positioning the adjustment ring and the bar, including leveling the bar, wherein the alignment ring includes a full disk presenting a plurality of elongated leg adjusting slots on inwardly projecting tabs, and an elongated adjusting slot;
    (f) a plurality of legs for maintaining the tracking attachment in position relative to the vehicle, wherein each leg is coupled with a respective one of the elongated leg adjusting slots of the alignment ring, and wherein each leg includes a magnet for magnetically coupling with the drum component of the vehicle;
    (g) a centering pin for centering the tracking attachment relative to the drum component of the vehicle, wherein the centering pin presents a cone end and a pointer end and is slideably insertable through the bar and the adjustment ring; and (h) a locking component coupled with the adjustment ring and the elongated adjusting slot of the alignment ring for locking the adjustment component and the bar component in position relative to the alignment component once the adjustment component and the bar component have been positioned.

20. The tracking attachment as set forth in claim 19, wherein the one or more targets are retroreflective bar-coded targets.

21. A method of measuring an alignment characteristic of a vehicle, the method comprising the steps of:
   (a) positioning a tracking attachment on the vehicle;
   (b) centering the tracking attachment over a center of a wheel drum component of the vehicle;
   (c) installing one or more target components on the tracking attachment;
   (d) leveling the tracking attachment;
   (e) locking the leveled tracking attachment in position;
   (f) positioning one or more base targets at specific reference points on the vehicle;
   (g) generating one or more laser beams which are reflected by the one or more target components and the one or more base targets;
   (h) deriving position data from the reflected one or more laser beams, wherein the position data identifies a position of each of the one or more target components and each of the one or more base targets; and
   (i) determining the alignment characteristic of the vehicle based on the position data derived from the reflected laser beams.

* * * * *